(12) United States Patent
Ismail

(10) Patent No.: US 8,194,631 B2
(45) Date of Patent: Jun. 5, 2012

(54) SYSTEM AND METHOD FOR PROVIDING DATA TO A WIRELESS COMMUNICATION DEVICE

(75) Inventor: Samir Ismail, Dublin, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 0 days.

(21) Appl. No.: 12/840,451

(22) Filed: Jul. 21, 2010

(65) Prior Publication Data

US 2010/0284375 A1 Nov. 11, 2010

Related U.S. Application Data

(63) Continuation of application No. 12/613,093, filed on Nov. 5, 2009, now Pat. No. 7,822,006, which is a continuation of application No. 11/365,378, filed on Feb. 28, 2006, now Pat. No. 7,633,916.

(60) Provisional application No. 60/761,509, filed on Jan. 24, 2006.

(51) Int. Cl.
*H04B 7/216* (2006.01)

(52) U.S. Cl. ..................... 370/338; 455/552.1
(58) Field of Classification Search .......... 455/406–408, 455/432.1, 552.1; 370/279, 331, 338
See application file for complete search history.

(56) References Cited

U.S. PATENT DOCUMENTS

| | | | | |
|---|---|---|---|---|
| 7,046,998 | B2 * | 5/2006 | Verma et al. | 455/418 |
| 7,356,557 | B2 * | 4/2008 | Kikuchi et al. | 709/201 |
| 7,633,916 | B2 * | 12/2009 | Ismail | 370/338 |
| 7,822,006 | B2 * | 10/2010 | Ismail | 370/338 |
| 2005/0246282 | A1 * | 11/2005 | Naslund et al. | 705/52 |
| 2006/0234762 | A1 * | 10/2006 | Ozluturk | 455/552.1 |

* cited by examiner

*Primary Examiner* — Sam Bhattacharya
(74) *Attorney, Agent, or Firm* — John L. Rogitz

(57) ABSTRACT

A system and method allowing a mobile device user to initiate a transaction over the most widely used network such as a CDMA or GSM network and then have the device complete the transaction over a specialized data network such as Wi-Fi. The system includes a server communicating with a wireless device that maintains indexed data from the user's original transaction to ensure integrity through the completion of the transaction. The system also includes a method for the user to purchase content, download the content and upon successful completion, have it appropriately billed.

18 Claims, 2 Drawing Sheets

SYSTEM AND METHOD FOR PROVIDING DATA TO A WIRELESS COMMUNICATION DEVICE

RELATED APPLICATION

This application is a continuation of and claims priority to U.S. patent application Ser. No. 12/613,093, filed Nov. 5, 2009 now U.S. Pat. No. 7,822,006, which is a continuation of U.S. patent application Ser. No. 11/365,378, filed Feb. 28, 2006, now U.S. Pat. No. 7,633,916, which in turn claims priority from U.S. provisional patent application Ser. No. 60/761,509, filed Jan. 24, 2006, priority from all of which is claimed.

FIELD OF THE INVENTION

The present invention relates generally to the sale of digital content over existing networks to mobile devices.

BACKGROUND OF THE INVENTION

Voice networks such as CDMA and GSM networks provide wide coverage for voice communication using mobile telephones. Although existing wireless telephony networks are optimized for voice communication, they may also provide somewhat limited data communication in various forms, such as instant messenger (IM) or short message service (SMS).

As understood herein, other wireless networks such as WiFi have also been provided that are oriented toward broader bandwidth wireless data communication and that can be used to, e.g., exploit the multimedia capability of many wireless telephones, but these networks typically are limited by hotspot coverage. The present invention understands that nonetheless, it would desirable to permit a user to purchase titles from the abundance of digital content available on the Internet any time the user likes without waiting for hot spot coverage, despite the difficulty in delivering content to mobile devices over telephony networks that are optimized for voice, not data, communication. Furthermore, the present invention understands the desirability for providing these features without requiring a user to purchase extra services beyond those that most users typically buy.

SUMMARY OF THE INVENTION

In non-limiting terms, a wireless communication device such as a mobile telephone can purchase digital content using a voice-optimized telephony network that, owing to its relatively narrow band, is not optimized to download large amounts of data such as multimedia streams. Then, when the wireless communication device establishes communication with a wider band data network, the transaction can be completed by downloading the digital content over the wider band network. Thus, in non-limiting implementations the wireless communication device can use, e.g., a messaging protocol such as short message service (SMS) or instant messenger (IM) that might be available on the voice optimized network (such as CDMA or GSM) to engage first part of a transaction to search, identify and purchase digital content, and then may consummate the transaction at such time as the wireless communication device enters the coverage area of a data network such as WiFi.

To coordinate these activities, a server on the Internet can communicate with both networks and thus is capable of communicating with the wireless communication device on either network to broker the transaction. The server might use a request and acknowledgement method to execute the necessary commands to complete the first part of the transaction. The server might also maintain a list of items purchased by the user. Predetermined events can trigger a data call on the broadband network to the broker server. After exchanging the purchased items list to confirm the transaction, the device and the server can proceed to download the digital content to the device and follow it with an appropriate billing action that may be done in non-limiting implementations with the carrier's billing system.

Accordingly, a wireless communication device includes a processor executing logic that includes generating, using a voice-optimized wireless telephony network, an order for content. The logic also includes receiving the content over a wireless data-optimized network.

In non-limiting implementations the generating act can be undertaken using SMS or IM, and the voice-optimized wireless telephony network may include a CDMA and/or GSM link. The wireless data-optimized network may include, without limitation, a WiFi link. In any case, a user of the wireless communication device may search for and purchase digital content using a messaging protocol of the voice-optimized wireless telephony network, with the downloading being undertaken without user interaction.

In another aspect, a system includes a wireless communication device, a broker server, and a voice-optimized wireless telephony network. The system also includes a wireless data-optimized network, and the wireless communication device communicates with the broker server using the voice-optimized wireless telephony network to order digital content for download over the wireless data-optimized network.

In yet another aspect, a method is disclosed that includes using a wireless communication device to submit a purchase order for digital content over a voice-optimized wireless telephony network, and then consummating the purchase order using a wireless data-optimized network.

In still another aspect, a broker server executes logic that includes receiving, from a wireless communication device, a purchase order for digital content over a voice-optimized wireless telephony network, and causing the purchase order to be satisfied using a wireless data-optimized network.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
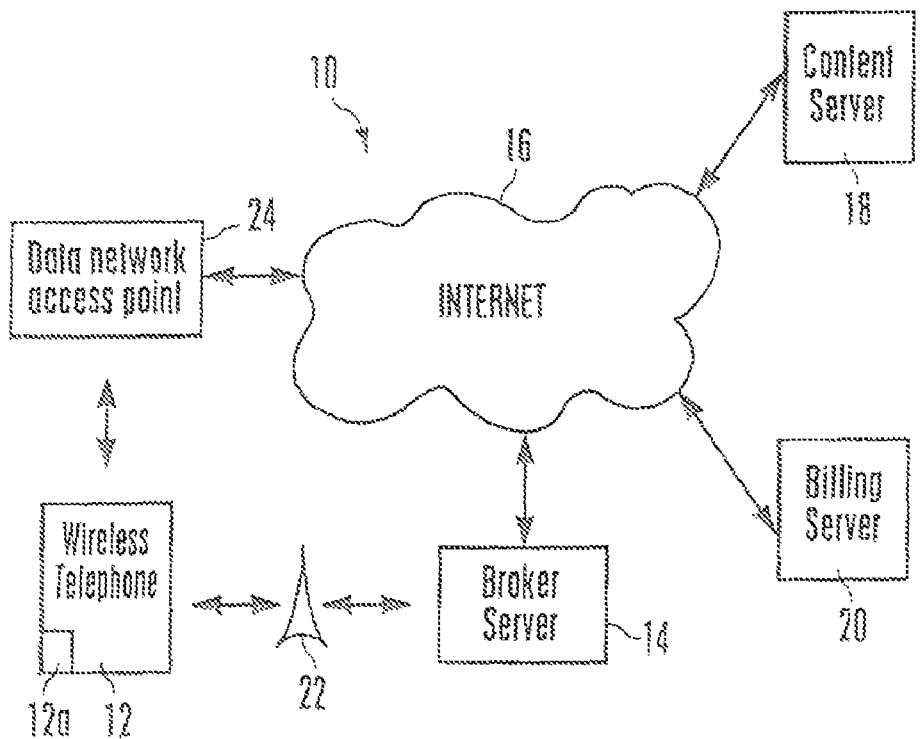
FIG. 1 is a block diagram of a non-limiting implementation of the present system.

Referring initially to FIG. 1, a system is shown. generally designated 10, that includes one or more wireless communication devices 12 (only a single wireless communication device shown for clarity) such as a wireless telephone with associated processor 12a and one or more broker servers 14 that communicate with the Internet 16. Content servers 18 that store digital content and billing servers 20 that undertake the billing below may also communicate with the Internet 16, it being understood that a single server or more than three servers may function to provide the functionality described herein.

As shown in FIG. 1, the wireless communication device 12 communicates with a voice-optimized wireless telephony network 22 (schematically represented in FIG. 1 by a telephony tower). Without limitation, the voice-optimized wireless telephony network 22 may include wireless CDMA links and/or wireless GSM links. Additionally, the wireless communication device 12, when in an appropriate coverage area, wirelessly communicates with a wireless data-optimized network that includes access points 24 (only one access point 24 shown for clarity). Without limitation, the wireless data-optimized network can include WiFi links, or Bluetooth links, etc.

Figure 2:
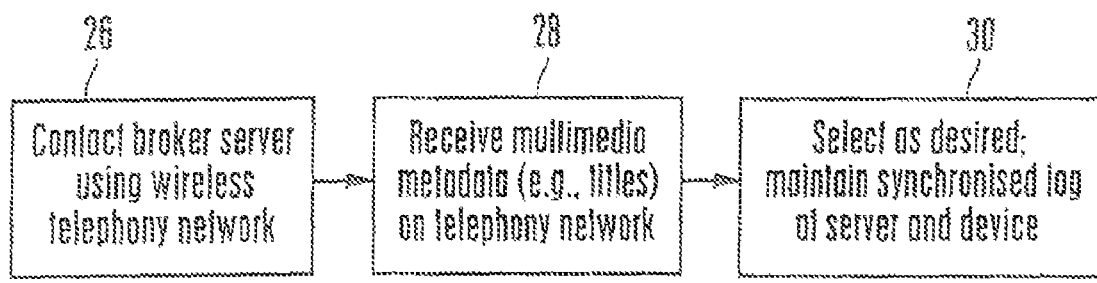
FIG. 2 is a flow chart of the ordering logic executed over a voice-optimized telephony network.
Figure 3:
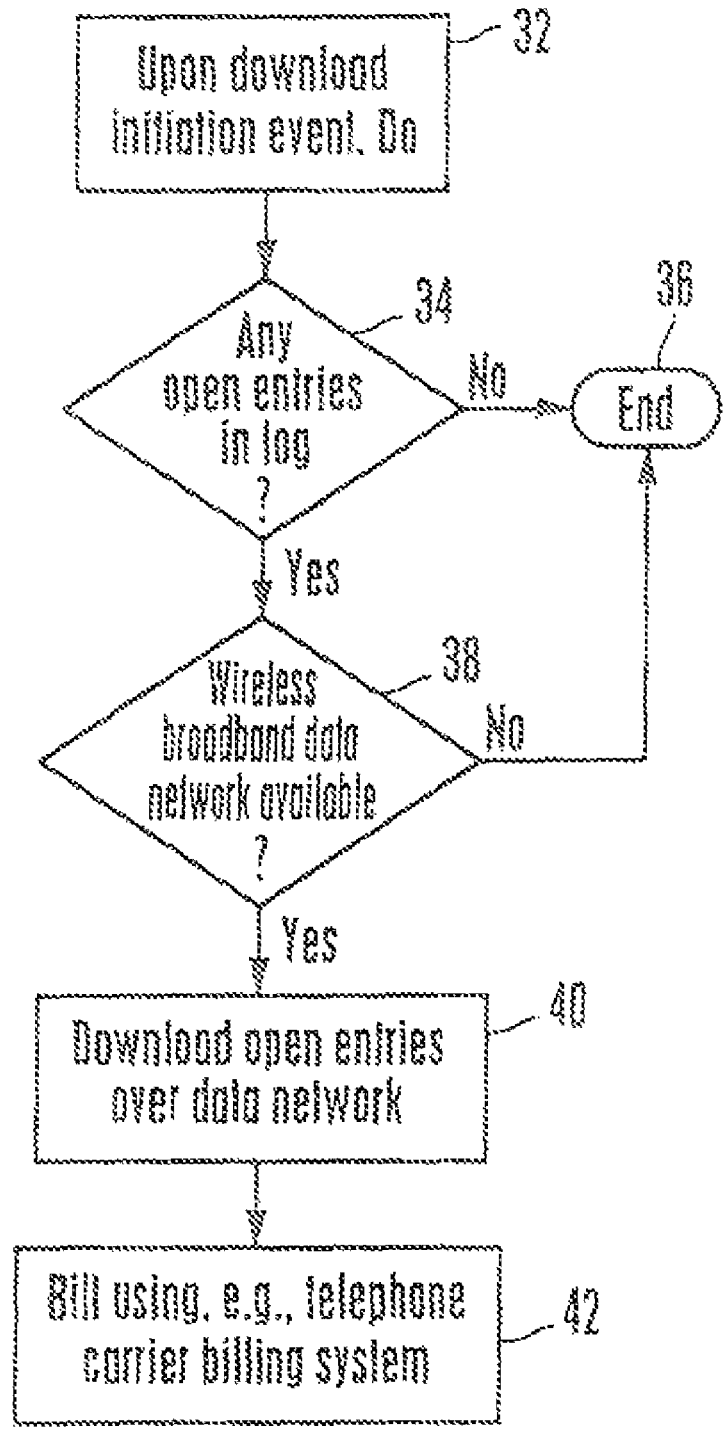
FIG. 3 is a flow chart of the transaction consummation logic that is executed over a wider band data-optimized network.

Now referring to FIGS. 2 and 3, while the present logic is illustrated in flow chart form, it is to be understood that in implementation it can be implemented in any appropriate form, e.g., in state logic. The logic may be executed at least in part by the processor 12a of the present wireless communication device as a software application that is separate from the embedded chip drivers typically included in wireless telephones, or that may be integrated into the chip.

Commencing at block 26, the wireless communication device 12 may contact the broker server 14 using the voice-optimized wireless telephony network 22 using, without limitation, a messaging protocol such as SMS or IM or push to talk. To this end, the broker server 14 may act as a mobile device on the voice-optimized wireless telephony network 22 and may have a phone number to which the messages can be sent and from which responses can be returned. In non-limiting implementations, request and response communication between the server 14 and the wireless communication device 12 can cover functional areas such as keyword searches for digital content and particular requests to purchase digital content such as music. Thus, at block 28 the server 14 may provide metadata such as a list of available multimedia content in, e.g., the content server 18 to the wireless communication device 12 in response to SMS keyword queries from the wireless communication device 12. To permit the wireless communication device 12 to parse the content of the messages from the server 14, a XML-type tagged language may be used in non-limiting implementations.

At block 30, the user of the wireless communication device 12 selects content for purchase as desired using the voice-optimized wireless telephony network 22. A log or other data structure of the selected content is maintained in synchronization at both the wireless communication device 12 and the broker server 14. The log can include, e.g., transaction identifications, content names, etc. This helps in eliminating any errors in the purchase transaction and ensures integrity in completing the second part of the transaction.

The broker server 14 can interact with any server on the Internet to fulfill the requests from the wireless communication device 12, for example, by interacting with the content server 18 to search and retrieve music that relates to keywords that may have been received from the wireless communication device 12 using, e.g., SMS queries. Any type of content servers are contemplated herein, including content servers containing books, music, ring tones, news stories, videos, etc. As stated above, once the user has purchased content over the voice-optimized wireless telephony network 22, the broker server 14 and the wireless communication device 12 synchronize between them the list of items purchased and end the session.

Now referring to FIG. 3, the logic for transferring purchased content to the wireless communication device 12 commences at block 32 upon the occurrence of a download initiation event. Without limitation, a download initiation event may include one or more of the following: detection at the wireless communication device 12 of entering into a coverage area of the wireless data-optimized network 24; elapse of a wait period; engagement of the wireless communication device 12 with a battery charging device; and energization of the wireless communication device 12. Thus, the digital content may be downloaded automatically without user interaction.

Moving to decision diamond 34, the wireless communication device 12 determines, using its log, whether any open (unfulfilled) purchases exist. In one implementation the broker server 14 and wireless communication device 12 match their logs and download items that both devices agree remain open. In the event of a conflict (typically because the log in the wireless communication device 12 is incomplete), the log in the server 14 is regarded as a master purchase list and trumps any incomplete list on the device 12.

If no open entries exist, the logic ends at state 36, but otherwise the logic moves to decision diamond 38 to determine whether the wireless communication device 12 is in communication with the wireless data-optimized network 24. It is to be understood that the test at decision diamond 38 can include determining whether the wireless communication device 12 is configured for wireless data-optimized network communication, whether the user is authorized to access the wireless data-optimized network, etc.

If the test at decision diamond 38 is positive, the logic flows to block 40 to download, over the wireless data-optimized network 24, the content indicated in the log. At block 42 billing data may be generated by, e.g., the billing server 20 in response to billing information from the broker server 14. The billing server 20 may be the billing server of the wireless telephony carrier associated with the wireless communication device 12. Confirmation of successful download may be provided prior to billing.

While the particular SYSTEM AND METHOD FOR PROVIDING DATA TO A WIRELESS COMMUNICATION DEVICE as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A wireless communication device, comprising:
a processor executing logic comprising:

completing, at least in part using a voice-optimized wireless telephony network, an order for preexisting digital content, the completing being at least an acknowledgement of the order responsive to a request from a server; and receiving the content over a wireless data-optimized network, further comprising enabling a user of the wireless communication device to search for and purchase the preexisting digital content using a messaging protocol of the voice-optimized wireless telephony network.

2. The wireless communication device of claim 1, wherein the completing act is undertaken using SMS.

3. The wireless communication device of claim 1, wherein the completing act is undertaken using IM.

4. The wireless communication device of claim 1, wherein the voice-optimized wireless telephony network includes at least one CDMA link.

5. The wireless communication device of claim 1, wherein the voice-optimized wireless telephony network includes at least one GSM link.

6. The wireless communication device of claim 1, wherein the wireless communication device is a wireless telephone.

7. The wireless communication device of claim 1, wherein the wireless data-optimized network includes at least one WiFi link.

8. The wireless communication device of claim 1, wherein the downloading act is undertaken without user interaction.

9. A system, comprising:
at least one broker server communicating with a wireless communication device over
at least one voice-optimized wireless telephony network at least in some periods, the broker server also communicating with the wireless communication device over
at least one data-optimized network at least in some periods; wherein
the server receives from the wireless communication device over the voice-optimized wireless telephony network at least a confirmation of an order for at least one item for download over the data-optimized network, the server responsive to the confirmation causing a download to the wireless communication device to occur over the data-optimized network.

10. The system of claim 9, wherein the voice-optimized wireless telephony network is associated with a billing server, the billing server being used to generate accounting data in response to downloading content to the wireless communication device over the data-optimized network.

11. The system of claim 9, wherein the voice-optimized wireless telephony network includes at least one CDMA link.

12. The system of claim 9, wherein the voice-optimized wireless telephony network includes at least one GSM link.

13. The system of claim 9, wherein the wireless communication device is a wireless telephone.

14. The system of claim 9, wherein the data-optimized network includes at least one WiFi link.

15. A method, comprising:
using a wireless communication device to submit a purchase order for digital content including e-book content over a wireless network;
consummating the purchase order using a data-optimized network; and
allowing a user of the wireless communication device to search for and purchase digital content using a messaging protocol of a voice-optimized wireless telephony network.

16. The method of claim 15, wherein the consummating act includes downloading the digital content, and is undertaken automatically without user interaction.

17. The method of claim 15, wherein the wireless network includes at least one GSM and/or CDMA wireless link.

18. The method of claim 17, wherein the wireless network includes at least one WiFi link.

* * * * *